T. V. BUSH.
Preserving Roots.
No. 28,558.
Patented June 5, 1860.
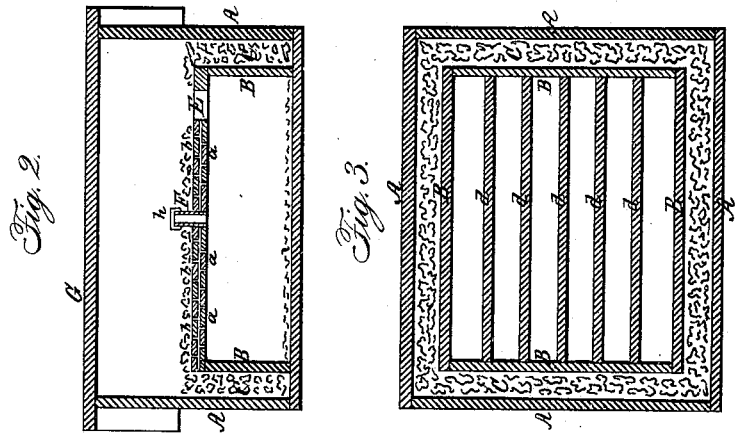
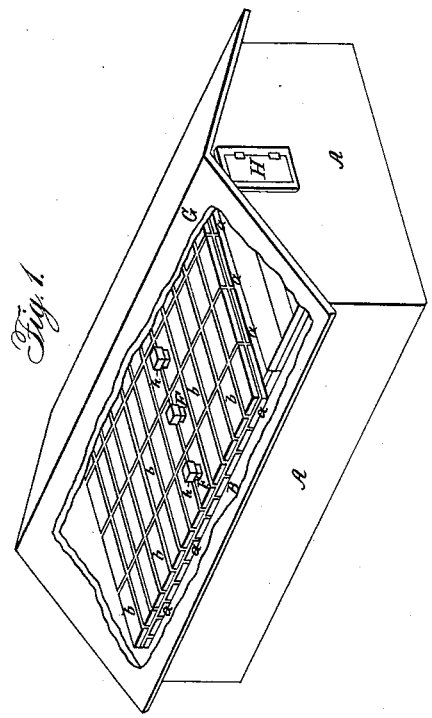
Witnesses:
E. Cohen
J. Hirsch
Inventor:
Thacker V Bush.
per atty A.B. Stoughton

UNITED STATES PATENT OFFICE.

THACKER V. BUSH, OF GALLATIN, TENNESSEE.

HOUSE FOR PRESERVING ROOTS.

Specification of Letters Patent No. 28,558, dated June 5, 1860.

*To all whom it may concern:*

Be it known that I, THACKER V. BUSH, of Gallatin, in the county of Sumner and State of Tennessee, have invented certain new and useful Improvements in the Process of Preserving Esculent Roots; and I do hereby declare that the following is a full, clear, and exact description of the operation of the same, reference being had to the accompanying drawings, in which—

Figure 1, represents a perspective view of a store house with a portion of the cover broken away to show the interior. Fig. 2, represents a longitudinal vertical section, and Fig. 3, represents a horizontal section through the same.

When esculent roots such as potatoes, or sweet potatoes, are stored in large heaps they are liable to sweat, ferment and to rot in a comparatively short time, for the reason that the foul air generated is pent up and cannot be expelled, and supplied by pure air; my invention relates to a house for preserving esculent roots, &c., composed of outward walls and a roof, and a series of inner compartments, which inner compartments are surrounded by, and covered over with, dry earth, as a filtering medium between the roots and the external air.

To enable others skilled in the art to make and use my invention I will proceed to describe the construction and operation of a preserving house which I have found in practice to answer well.

A represents the four walls of the store house which may be made of earth, mortar, brick, logs or timber; B, represents the inner walls, which may be also made of similar material. The space C between the inner and out walls is filled up with dry earth. The inner walls B when made of wood, may be lined on the inside with clay or mortar. The space inclosed by the inner walls, B, is divided off into a number of chambers or compartments by partitions, $d$, of brick clay, or any other suitable material and which are covered over with two layers of boards, $a$, and $b$ in such a manner that small spaces shall be left between each two consecutive boards, as also between the two layers, and that the boards of the upper layer shall cover the spaces which are between the boards of the lower tier.

E represents apertures by which the several compartments can be entered to store or remove the roots and which can be closed by suitable doors.

F represents flues through which the air may escape from the compartments to ventilate them and which can be opened or closed by means of the covers, $h$. The entire house is covered by a roof G and can be entered from without through the door H.

Preparatory to storing the roots, the bottoms of the several compartments are covered with sand or dry earth and the roots are then thrown into said compartments, the trap doors are closed, and the entire inner chamber is covered with dry earth, which rests on the boards $b$. The roots are now effectually protected against frost or heat but the external air can still percolate the dry earth which covers the inner house and may pass through the spaces, between the boards, $a$, and $b$ down into the compartments and take the place of the foul air which will escape through the flues, F, or other escapes whereby a continuous circulation of pure air is maintained which will effectually preserve the roots for a comparatively long period as I have proven by actual experiments—the dry earth being a good filtering medium for the entering fresh air, and driving out through the ventilators or air escapes any foul gases which may arise from the roots. The atmospheric air in filtering through the dry earth, deposits its moisture in the earth, and enters the chambers in a comparatively dry state, so that it is ready to absorb the impure gases or air in the chambers and be the vehicle to carry them off; and it is highly probable that the well known principle of transmission of gases through a common medium may enter into this equalizing of the gases, so that the process may be partly mechanical, and partly chemical—the impulsion being carried on through the dry earth by which means an uninterrupted communication is produced between the atmospheric air on one side, and the noxious gases arising from the roots on the other side of it. The pipes F, need only be used when the roots are first stored, and the excess of moisture is rising from them—after this period, the osmose or impulsion goes on, with the pipes closed.

Having thus fully described the nature of my invention, what I claim therein as new and desire to secure by Letters Patent is—

In combination with the outer walls and covering, a series of inner compartments, which inner compartments are surrounded by and covered over with dry earth, as a filtering medium between the roots, and the external air, for the purpose of storing and preserving said roots, substantially in the manner herein described.

THACKER V. BUSH.

Witnesses:
  E. COHEN,
  I. HIRSCH.